US008549196B2

(12) United States Patent
Salapura et al.

(10) Patent No.: US 8,549,196 B2
(45) Date of Patent: *Oct. 1, 2013

(54) HARDWARE SUPPORT FOR SOFTWARE CONTROLLED FAST MULTIPLEXING OF PERFORMANCE COUNTERS

(75) Inventors: Valentina Salapura, Yorktown Heights, NY (US); Robert W. Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,528

(22) Filed: Aug. 3, 2012

(65) Prior Publication Data

US 2013/0019086 A1    Jan. 17, 2013

Related U.S. Application Data

(63) Continuation of application No. 12/684,429, filed on Jan. 8, 2010, now Pat. No. 8,347,001.

(51) Int. Cl.
*G06F 13/12* (2006.01)
*G06F 1/24* (2006.01)

(52) U.S. Cl.
USPC ............................................ 710/62; 713/100

(58) Field of Classification Search
None
See application file for complete search history.

(56) References Cited

U.S. PATENT DOCUMENTS

| 5,463,761 | A | 10/1995 | Culley |
| 6,112,318 | A | 8/2000 | Jouppi et al. |
| 6,931,354 | B2 * | 8/2005 | Jones et al. ................ 702/186 |
| 7,272,754 | B2 | 9/2007 | Love et al. |
| 2004/0004495 | A1 | 1/2004 | Moss |
| 2006/0167658 | A1 | 7/2006 | Mericas |
| 2008/0177756 | A1 | 7/2008 | Kosche et al. |
| 2009/0077571 | A1 | 3/2009 | Gara et al. |

OTHER PUBLICATIONS

U.S. Official Action mailed May 3, 2012 in related U.S. Appl. No. 12/684,496.
U.S. Notice of Allowance mailed May 22, 2012 in related U.S. Appl. No. 12/684,172.
U.S. Notice of Allowance mailed May 24, 2012 in related U.S. Appl. No. 12/684,367.

(Continued)

*Primary Examiner* — Idriss N Alrobaye
*Assistant Examiner* — Richard B Franklin
(74) *Attorney, Agent, or Firm* — Scully, Scott, Murphy & Presser, P.C.; Daniel P. Morris, Esq.

(57) ABSTRACT

Performance counters may be operable to collect one or more counts of one or more selected activities, and registers may be operable to store a set of performance counter configurations. A state machine may be operable to automatically select a register from the registers for reconfiguring the one or more performance counters in response to receiving a first signal. The state machine may be further operable to reconfigure the one or more performance counters based on a configuration specified in the selected register. The state machine yet further may be operable to copy data in selected one or more of the performance counters to a memory location, or to copy data from the memory location to the counters, in response to receiving a second signal. The state machine may be operable to store or restore the counter values and state machine configuration in response to a context switch event.

20 Claims, 5 Drawing Sheets

(56) References Cited

OTHER PUBLICATIONS

Moore, Research Disclosure Database No. 481010, High Performance Dynamically Updateable Software Architecture, May 2004.

International Search Report and Written Opinion mailed Dec. 23, 2010 in related International Application No. PCT/US10/53643.

Dalton, Chris et al., Afterburner: A Network-independent card provides architectural support for high-performance protocols, IEEE Jul. 1993.

Cameron, K.W., Instruction level characterization of scientific computing applications using hardware performance counters, IEEE Workload Characterization: Methodology and Case Studies, pp. 125-131, 1999.

U.S. Office Action mailed in related U.S. Appl. No. 13/446,467 on Dec. 7, 2012.

Browne et al., A Portal Programming Interface for Performance Evaluation on Modern Processors, Aug. 2000, pp. 189-204.

U.S. Office Action mailed in related U.S. Appl. No. 12/684,190 on Nov. 15, 2012.

\* cited by examiner

HARDWARE SUPPORT FOR SOFTWARE CONTROLLED FAST MULTIPLEXING OF PERFORMANCE COUNTERS

CROSS-REFERENCE TO RELATED APPLICATIONS

This application is a continuation of U.S. patent application Ser. No. 12/684,429 filed on Jan. 8, 2010, the entire contents of which are incorporated herein by reference.

The present invention is related to the following commonly-owned, co-pending United States Patent Applications filed on even date herewith, the entire contents and disclosure of each of which is expressly incorporated by reference herein as if fully set forth herein. U.S. patent application Ser. No. 12/684,367, for "USING DMA FOR COPYING PERFORMANCE COUNTER DATA TO MEMORY"; U.S. patent application Ser. No. 12/684,172 for "HARDWARE SUPPORT FOR COLLECTING PERFORMANCE COUNTERS DIRECTLY TO MEMORY"; U.S. patent application Ser. No. 12/684,190 for "HARDWARE ENABLED PERFORMANCE COUNTERS WITH SUPPORT FOR OPERATING SYSTEM CONTEXT SWITCHING"; U.S. patent application Ser. No. 12/684,496, for "HARDWARE SUPPORT FOR SOFTWARE CONTROLLED FAST RECONFIGURATION OF PERFORMANCE COUNTERS"; U.S. patent application Ser. No. 12/697,799, for "DISTRIBUTED PERFORMANCE COUNTERS"; U.S. patent application Ser. No. 12/684,738, for "LOCAL ROLLBACK FOR FAULT-TOLERANCE IN PARALLEL COMPUTING SYSTEMS"; U.S. patent application Ser. No. 12/696,780, for "LOCAL ROLLBACK FOR FAULT-TOLERANCE IN PARALLEL COMPUTING SYSTEMS"; U.S. patent application Ser. No. 12/684,860, for "PROCESSOR WAKE ON PIN"; U.S. patent application Ser. No. 12/684,174, for "PRECAST THERMAL INTERFACE ADHESIVE FOR EASY AND REPEATED, SEPARATION AND REMATING"; U.S. patent application Ser. No. 12/684,184, for "ZONE ROUTING IN A TORUS NETWORK"; U.S. patent application Ser. No. 12/684,852, for "PROCESSOR WAKEUP UNIT"; U.S. patent application Ser. No. 12/684,642, for "TLB EXCLUSION RANGE"; U.S. patent application Ser. No. 12/684,804, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. patent application Ser. No. 12/986,349, for "ORDERING OF GUARDED AND UNGUARDED STORES FOR NO-SYNC I/O"; U.S. patent application Ser. No. 12/693,972, for "DISTRIBUTED PARALLEL MESSAGING FOR MULTIPROCESSOR SYSTEMS"; U.S. patent application Ser. No. 12/688,747, for "SUPPORT FOR NON-LOCKING PARALLEL RECEPTION OF PACKETS BELONGING TO THE SAME MESSAGE"; U.S. patent application Ser. No. 12/688,773 (YOR920090560US1 (24714)), for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, for "A MULTI-PETASCALE HIGHLY EFFICIENT PARALLEL SUPERCOMPUTER"; U.S. patent application Ser. No. 12/984,252, for "CACHE DIRECTORY LOOK-UP REUSE"; U.S. patent application Ser. No. 13/008,502, for "MEMORY SPECULATION IN A MULTI LEVEL CACHE SYSTEM"; U.S. patent application Ser. No. 13/008,583, for "METHOD AND APPARATUS FOR CONTROLLING MEMORY SPECULATION BY LOWER LEVEL CACHE"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 12/696,825, for "LIST BASED PREFETCH"; U.S. patent application Ser. No. 12/684,693, for "PROGRAMMABLE STREAM PREFETCH WITH RESOURCE OPTIMIZATION"; U.S. patent application Ser. No. 13/004,005, for "FLASH MEMORY FOR CHECKPOINT STORAGE"; U.S. patent application Ser. No. 12/731,796, for "NETWORK SUPPORT FOR SYSTEM INITIATED CHECKPOINTS"; U.S. patent application Ser. No. 12/696,746, for "TWO DIFFERENT PREFETCH COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 12/727,967, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287 for ARBITRATION IN CROSSBAR FOR LOW LATENCY; U.S. patent application Ser. No. 12/684,630 for EAGER PROTOCOL ON A CACHE PIPELINE DATAFLOW; U.S. patent application Ser. No. 12/723,277 for EMBEDDED GLOBAL BARRIER AND COLLECTIVE IN A TORUS NETWORK; U.S. patent application Ser. No. 12/696,764 for GLOBAL SYNCHRONIZATION OF PARALLEL PROCESSORS USING CLOCK PULSE WIDTH MODULATION; U.S. patent application Ser. No. 12/796,411 for IMPLEMENTATION OF MSYNC; U.S. patent application Ser. No. 12/796,389 for NON-STANDARD FLAVORS OF MSYNC; U.S. patent application Ser. No. 12/696,817 for HEAP/STACK GUARD PAGES USING A WAKEUP UNIT; U.S. patent application Ser. No. 12/697,164 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475 for REPRODUCIBILITY IN BGQ.

STATEMENT REGARDING FEDERALLY SPONSORED RESEARCH OR DEVELOPMENT

This invention was made with Government support under Contract No.: B554331 awarded by Department of Energy. The Government has certain rights in this invention.

FIELD OF THE INVENTION

The present disclosure relates generally to performance counters, and more particularly to hardware support for software controlled multiplexing of performance counters.

BACKGROUND

Understanding the performance of programs running on today's chips is complicated. Programs themselves are becoming increasingly complex and intertwined with a growing number of layers in the software stack. Hardware chips are also becoming more complex. The current generation of chips is multicore and the next generation will be likely to have even more cores and will include networking, switches, and other components integrated on to the chip.

Performance counters can help programmers address the challenges created by the above complexity by providing insight into what is happening throughout the chip, in the functional units, in the caches, and in the other components on the chip. Performance counter data also helps programmers understand application behavior. Chips have incorporated performance counter events for several generations, and software ecosystems have been designed to help analyze the data provided by such counters. Among the significant limitations of performance counters are the number of counters that may be gathered simultaneously and the rate at which the data may be gathered.

Hardware performance counters provide insight into the behavior of the various aspects of a chip. Generally, hardware performance counters are extra logic added to the central processing unit (CPU) to track low-level operations or events within the processor. For example, there are counter events that are associated with the cache hierarchy that indicate how many misses have occurred at L1, L2, and the like. Other counter events indicate the number of instructions completed, number of floating point instructions executed, translation lookaside buffer (TLB) misses, and others. Depending on the chip there are 100 s to a 1000 or so counter events that provide information about the chip. However, most chip architectures only allow a small subset of these counter events to be counted simultaneously due to a small number of performance counters implemented There are several engineering reasons why it is difficult to gather a large number of counters. One is that some of the useful data originates in areas of the chip where area is a very scarce resource. Another reason is that trying to provide paths and multiplexers to export many counters takes power and area that is not available. Counters themselves are implemented as latches, and a large number of large counters require large area and power. What is needed is an efficient mechanism to best utilize the limited performance counters that are available.

One way to better utilize the limited number of hardware counters is to multiplex between groups of them. That is, software can create a number of different sets of hardware counter groups and then can switch between the groups over time. If software can do this relatively quickly, for example, every 100 microseconds, then it can appear to higher-level software as if there are actually more counters than what the hardware actually provides. There is a tradeoff. The more frequently the groups are switched between, the more accurate the results. However, the more frequently the groups are switched between, the more overhead is incurred. Performing multiplexing in software is expensive in terms of time. There are many instructions that need to be executed, and frequently, a context switch needs to occur.

Operating Systems, e.g., Windows™ XP™, Linux™, are entities that manage the hardware resources, e.g., disks, memory, hardware performance counters, etc., of a computer and make them available to an application. One particular abstract an operating system provides is called a process. A process is an entity that runs an application. Among many responsibilities involved in managing processes, an operating system is responsible for managing context switching. To perform a context switch, the operating system saves the state of the running process in a place that can be later retrieved when the process needs to be run again. The operating system then locates the state of the process it wishes to execute and loads that process's state from where it had stored it. The performance of the context switch path is an affecting factor for achieving good performance for some classes of application.

Associated with each process is a set of machine state, this state includes, among information, the values of the current registers, including general registers, floating point registers, machine status registers, and hardware performance counter state and data. For some modes of performance monitoring tools, the hardware performance counter information must be kept on a per-process base. The operating system may be responsible for providing a mechanism that allows this hardware performance counter state to be saved before a context switch and restored after the context switch. The operating system should provide a mechanism that performs this operation for each process on every context switch.

For saving the hardware performance counter state before a context switch and restoring the state after the context switch, conventionally operating system would have to read the control registers associated with the hardware performance counter control and each of the counters individually. While the number of hardware performance control registers and counters varies among different chip architectures, this can take significant time, thus a mechanism that allows for more efficient saving and restoring of the hardware performance control registers and counter data would be beneficial.

Software uses the values from performance counters. To get these values, performance counters have to explicitly be read out. Depending where the counters are located, they are read out either as a set of registers, or as a set of memory locations (memory mapped registers—MMRs). The code to read the counters implements one load instruction for each read request for each counter. For a system with larger number of counters, and/or where the counter access latency is large, reading out all counters will have significant latency, and will block the processor handling this function call during that time.

It would therefore be advantageous to have a performance counter unit which supports fast OS context switching, fast performance counters copy into memory, and fast counters reconfiguration, and does so in a single system

BRIEF SUMMARY

A device and a method for providing hardware support for multiplexing of performance counters are provided. The device in one aspect may include a plurality of performance counters operable to collect one or more counts of one or more selected activities. A plurality of registers may be operable to store a set of performance counter configurations. A state machine may be operable to automatically select a register from the plurality of registers for reconfiguring the one or more performance counters in response to receiving a first signal. The state machine may be further operable to reconfigure the one or more performance counters based on a configuration specified in the selected register. The state machine may be yet further operable to copy data in selected one or more of the plurality of performance counters to a memory location, or from the memory locations to the counters, or both, in response to receiving a second signal.

A method for providing hardware support for multiplexing of performance counters in one aspect may include writing a plurality of configuration values, the plurality of configuration values for indicating to hardware to automatically start context switching a plurality of performance counter data, to automatically transfer a plurality of performance counter data between a plurality of performance counters and memory location, or to automatically reconfigure the plurality of performance counters, or combinations thereof. The method may also include, based on the plurality of configuration values, the hardware automatically starting context switching a plurality of performance counter data, automatically transferring a plurality of performance counter data between a plurality of performance counters and memory location, or automatically reconfiguring the plurality of performance counters, or combinations thereof.

Further features as well as the structure and operation of various embodiments are described in detail below with reference to the accompanying drawings. In the drawings, like reference numbers indicate identical or functionally similar elements.

DETAILED DESCRIPTION

The present disclosure, in one aspect, describes hardware support to facilitate the efficient counter reconfiguration, OS switching and storing of hardware performance counters. Particularly, in one aspect, the hardware support of the present disclosure allows specification of a set of groups of hardware performance counters, and the ability to switch between those groups without software intervention. Hardware switching may be performed, for example, for reconfiguring the performance counters, for instance, to be able to collect information related to different sets of events and activities occurring on a processor or system. Hardware switching also may be performed, for example, as a result of operating system context switching that occurs between the processes or threads. The hardware performance counter data may be stored directly to memory and/or restored directly from memory, for example, without software intervention, for instance, upon reconfiguration of the performance counters, operating system context switching, and/or at a predetermined interval or time.

The description of the embodiments herein uses the term "hardware" interchangeably with the state machine and associated registers used for controlling the automatic copying of the performance counter data to memory. Further, the term "software" may refer to the hypervisor, operating system, or another tool that either of those layers has provided direct access of the hardware to. For example, the operating system could set up a mapping, allowing a tool with the correct permission to interact directly with the hardware state machine.

In one aspect, hardware and software may be combined to allow for the ability to set up a series of different configurations of hardware performance counter groups. The hardware then may automatically switch between the different configurations. For the hardware to automatically switch between the different configurations, the software may set an interval timer that counts down, which upon reaching zero, switches to the next configuration in the stored set of configurations. For example, the software may set up a set of configurations that it wants the hardware to switch between and also set a count of the number of hardware configurations it has set up. In response to the interval timer reaching zero, the hardware may change the currently collected set of hardware performance counter data automatically without involving the software and set up a new group of hardware performance counters to start being collected. The hardware may automatically copy the current value in the counters to the pre-determined area in the memory. In another aspect, the hardware may switch between configurations in response to receiving a signal from another device, or receiving an external interrupt or others. In addition, the hardware may store the performance counter data directly in memory automatically In one embodiment, a register or memory location specifies the number of times to perform the configuration switch. In another embodiment, rather than a count, an on/off binary value may indicate whether hardware should continue switching configurations or not. Yet in another embodiment, the user may set a register or memory location to indicate that when the hardware switches groups, it should clear performance counters. In still yet another embodiment, a mask register or memory location may be used to indicate which counters should be cleared.

Figure 1:
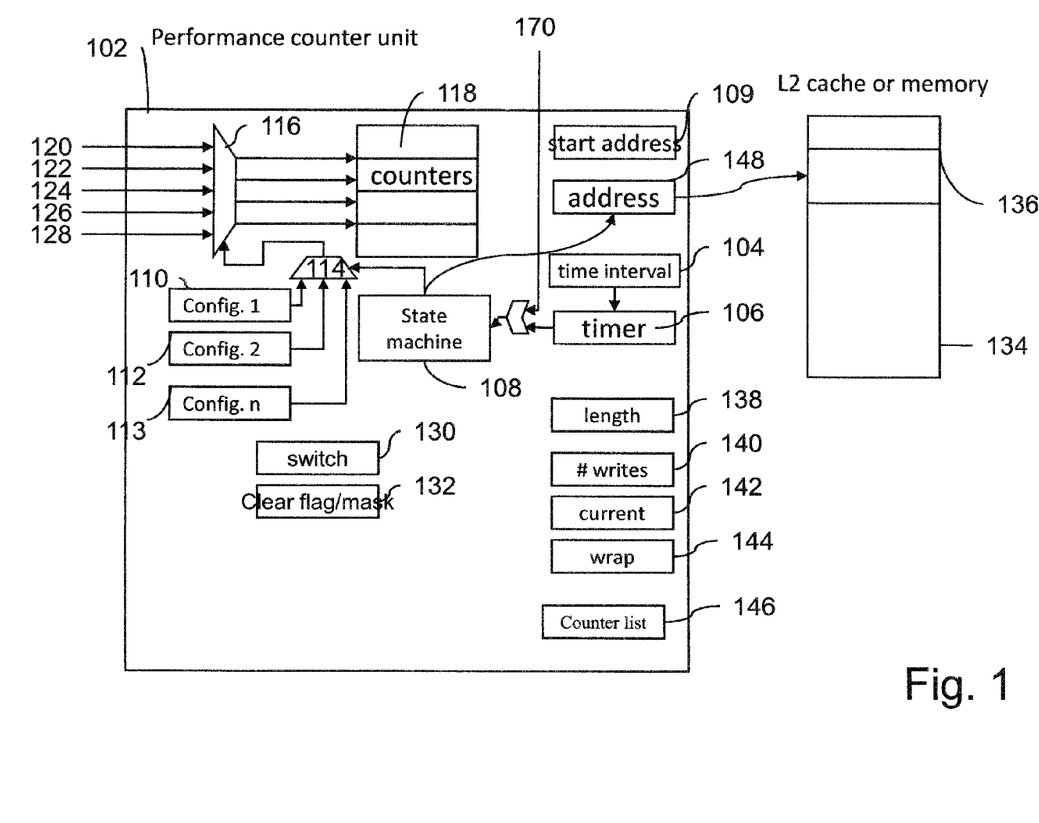
FIG. 1 shows a hardware device that supports performance counter reconfiguration and counter copy in one embodiment of the present disclosure.

FIG. 1 shows a hardware device 102 that supports performance counter switching in one embodiment of the present disclosure. The device 102 may be built into a microprocessor and includes a plurality of hardware performance counters 118, which are registers or the like used to store the counts of hardware-related activities within a computer. Examples of activities of which the counters 118 may store counts may include, but are not limited to, cache misses, translation lookaside buffer (TLB) misses, the number of instructions completed, number of floating point instructions executed, processor cycles, input/output (I/O) requests, and network related activities, other hardware-related activities and events.

A plurality of configuration registers 110, 112, 113 may each include a set of configurations that specify what activities and/or events the counters 118 should count. For example, configuration 1 register 110 may specify counter events related to the network activity, like the number of packets sent or received in each of networks links, the errors when sending or receiving the packets to the network ports, or the errors in the network protocol. Similarly, configuration 2 register 112 may specify a different set of configurations, for example, counter events related to the memory activity, for instance, the number of cache misses for any or all cache level L1, L2, L3, or the like, or the number of memory requests issued to each of the memory banks for on-chip memory, or the number of cache invalidates, or any memory coherency related events. Yet another counter configuration can include counter events related to one particular process activity in a chip multiprocessor systems, for example, instructions issued or instructions completed, integer and floating-point instructions, for the process 0, or for any other process. Yet another counter configuration may include the same type of counter events but belonging to different processes, for example, the number of integer instructions issued in all N processes. Any other counter configurations are possible. In one aspect, software may set up those configuration registers to include desired set of configurations by writing to those registers.

Initially, the state machine 108 may be set to select a configuration (e.g., 110, 112, ..., or 113), for example, using a multiplexer or the like at 114. A multiplexer or the like at 116 then selects from the activities and/or events 120, 122, 124, 126, 128, etc., the activities and/or events specified in the selected configuration (e.g., 110 or 112) received from the multiplexer 114. Those selected activities and/or events are then sent to the counters 118. The counters 118 accumulate the counts for the selected activities and/or events.

A time interval component 104 may be a register or the like that stores a data value. In another aspect, the time interval component 104 may be a memory location or the like. Software such as an operating system or another program may set the data value in the time interval 104. A timer 106 may be another register that counts down from the value specified in the time interval register 104. In response to the count down value reaching zero, the timer 106 notifies a control state machine 108. For instance, when the timer reaches zero, this condition is recognized, and a control signal connected to the state machine 108 becomes active. Then the timer 106 may be reset to the time interval value to start a new period for collecting data associated with the next configuration of hardware performance counters.

In another aspect, an external interrupt or another signal 170 may trigger the state machine 108 to begin reconfiguring the hardware performance counters 118.

In response to receiving a notification from the timer 106 or another signal, the control state machine 108 selects the next configuration register, e.g., configuration 1 register 110 or configuration 2 register 112 to reconfigure activities tracked by the performance counters 118. The selection may be done using a multiplexer 114, for example, that selects between the configuration registers 110, 112, 113. It should be noted that while three configuration registers are shown in this example, any number of configuration registers may be implemented in the present disclosure. Activities and/or events (e.g., as shown at 120, 122, 124, 126, 128, etc.) are selected by the multiplexer 116 based on the configuration selected at the multiplexer 114. Each counter at 118 accumulates counts for the selected activities and/or events.

In another embodiment, there may be a register or memory location labeled "switch" 130 for indicating the number of times to perform the configuration switch. In yet another embodiment, the indication to switch may be provided by an on/off binary value. In the embodiment with a number of possible switching between the configurations, the initial value may be specified by software. Each time the state machine 108 initiates state switching, the value of the remaining switching is decremented. Once the number of the allowed configuration switching reaches zero, all further configuration change conditions are ignored. Further switching between the configurations may be re-established after intervention by software, for instance, if the software re-initializes the switch value.

In addition, a register or memory location "clear" 132 may be provided to indicate whether to clear the counters when the configuration switch occurs. In one embodiment, this register has only one bit, to indicate if all counter values have to be cleared when the configuration is switched. In another embodiment, this counter has a number of bits M+1, where M is the number of performance counters 118. These register or memory values may be a mask register or memory location for indicating which of M counters should be cleared. In this embodiment, when configuration switching condition is identified, the state machine 108 clears the counters and selects different counter events by setting appropriate control signals for the multiplexer 116. If the clear mask is used, only the selected counters may be cleared. This may be implemented, for example, by AND-ing the clear mask register bits 132 and "clear registers" signal generated by the state machine 108 and feeding them to the performance counters 118.

In addition, or instead of using the time interval register 104 and timer 106, an external signal 170 generated outside of the performance monitoring unit may be used to start reconfiguration. For example, this signal may be an interrupt signal generated by a processor, or by some other component in the system. In response to receiving this external signal, the state machine 108 may start reconfiguration in the same way as described above.

In addition, the software may specify a memory location 136 and have the hardware engine copy the counters without the software getting involved. In another aspect, the software may specify a sequence of memory locations and have the hardware perform a sequence of copies from the hardware performance counter registers to the sequence of memory locations specified by software.

The hardware may be used to copy the values of performance monitoring counters 118 from the performance monitoring unit 102 directly to the memory area 136 without intervention of software. The software may specify the starting address 109 of the memory where the counters are to be copied, and a number of counters to be copied.

In hardware, events are monitored and counted, and an element such as a timer 106 keeps track of time. After a time interval expires, or another triggering event, the hardware may start copying counter values to the predetermined memory locations. For each performance counter, the destination memory address 148 may be calculated, and a set of signals for writing the counter value into the memory may be generated. After the specified counters are copied to memory, the timer (or another triggering event or element) may be reset.

Referring to FIG. 1, a register or a memory location 140 may specify how many times the hardware state machine should copy the hardware performance counter registers 118 to memory. Software, such as the operating system, or a performance tool the operating system enabled to directly access the hardware state machine control registers, may set this register to frequency at which it wants the hardware performance counter registers 118 sampled.

In another aspect, instead of a separate register or memory location 140, the register at 130 that specifies the number of configuration switches may be also used for specifying the number of memory copies. In this case, the number of reconfigurations and copying to memory may coincide.

Another register or memory location 109 may provide the start memory location of the first memory address 148. For example, the software program running in address space A, may have allocated memory to provide space to write the data. A segmentation fault may be generated if the specific memory location is not mapped writable into the user address space A that interacted with the hardware state machine 108 to set up the automatic copying.

Yet another register or memory location 138 may indicate the length of the memory region to be written to. For each counter to be copied, hardware calculates the destination address, which is saved in the register 148.

For the hardware to automatically and directly perform copy of data from the performance counters 108 to store in the memory area 134, the software may set a time interval in the register 104. The time interval value may be copied into the timer 106 that counts down, which upon reaching zero, triggers a state machine 108 to invoke copying of the data to the address of memory specified in register 148. For each new value to be stored, the current address in register 148 is calculated. When the interval timer reaches zero, the hardware may perform the copying automatically without involving the software. The time interval register 104 and the timer 106 may be utilized by the performance counter unit for both counter reconfiguration and counter copy to memory, or there may be two sets of time interval registers and timers, one used for directly copying the performance counter data to memory, the other used for counter reconfiguration. In this manner, the reconfiguration of the hardware performance counters and copying of hardware performance counter data may occur independently or asynchronously.

In addition, or instead of using the time interval register 104 and timer 106, an external signal 170 generated outside of the performance monitoring unit may be used to start direct copying. For example, this signal may be an interrupt signal generated by a processor or by some other component in the system.

Optionally, a register or memory location 146 may contain a bit mask indicating which of the hardware performance counter registers 118 should be copied to memory. This allows software to choose a subset of the registers. Copying and storing only a selected set of hardware performance counters may be more efficient in terms of the amount of the memory consumed to gather the desired data.

The software is responsible for pre-allocating a region of memory sufficiently large to hold the intended data. In one aspect, if the software does not pass a large enough buffer in, a segmentation fault will occur when the hardware attempts to write the first piece of data beyond the buffer provided by the user (assuming the addressed location is unmapped memory).

Another register or memory location 140 may store a value that specifies the number of times to write the above specified hardware performance counters to memory 134. This register may be decremented every time the hardware state machine starts copying all, or a subset of counters to the memory. Once this register reaches zero, the counters are no longer copied until the next re-programming by software. Alternatively or additionally, the value may include an on or off bit which indicates whether the hardware should collect data or not.

The memory location for writing and collecting the counter data may be a pre-allocated block 136 at the memory 134 such as L2 cache or another with a starting address (e.g., specified in 109) and a predetermined length (e.g., specified in 138). In one embodiment, the block 136 may be written once until the upper boundary is reached, after which an interrupt signal may be initialized, and further copying is stopped. In another embodiment, memory block 136 is arranged as a circular buffer, and it is continuously overwritten each time the block is filled. In this embodiment, another register 144 or memory location may be used to store an indication as to whether the hardware should wrap back to the beginning of the area, or stop when it reaches the end of the memory region or block specified by software. Memory device 134 that stores the performance counter data may be an L2 cache, L3 cache, or memory.

The memory location for writing and collecting the counter data may be a set of distinct memory blocks specified by set of addresses and lengths. For example, the element shown at 109 may be a set of registers or memory locations that specify the set of start memory locations of the memory blocks 134. Similarly, the element shown at 138 may be another set of registers or memory locations that indicate the lengths of the set of memory blocks to be written to. The starting addresses 109 and lengths 138 may be organized as a list of available memory locations. A hardware mechanism, such as a finite state machine 108 in the performance counter unit 102 may point from memory region to memory region as each one gets filled up. The state machine may use current pointer register or memory location 142 to indicate where in the multiple specified memory regions the hardware is currently copying to, or which of the pairs of start address 109 and length 138 it is currently using from the performance counter unit 102.

Figure 2:
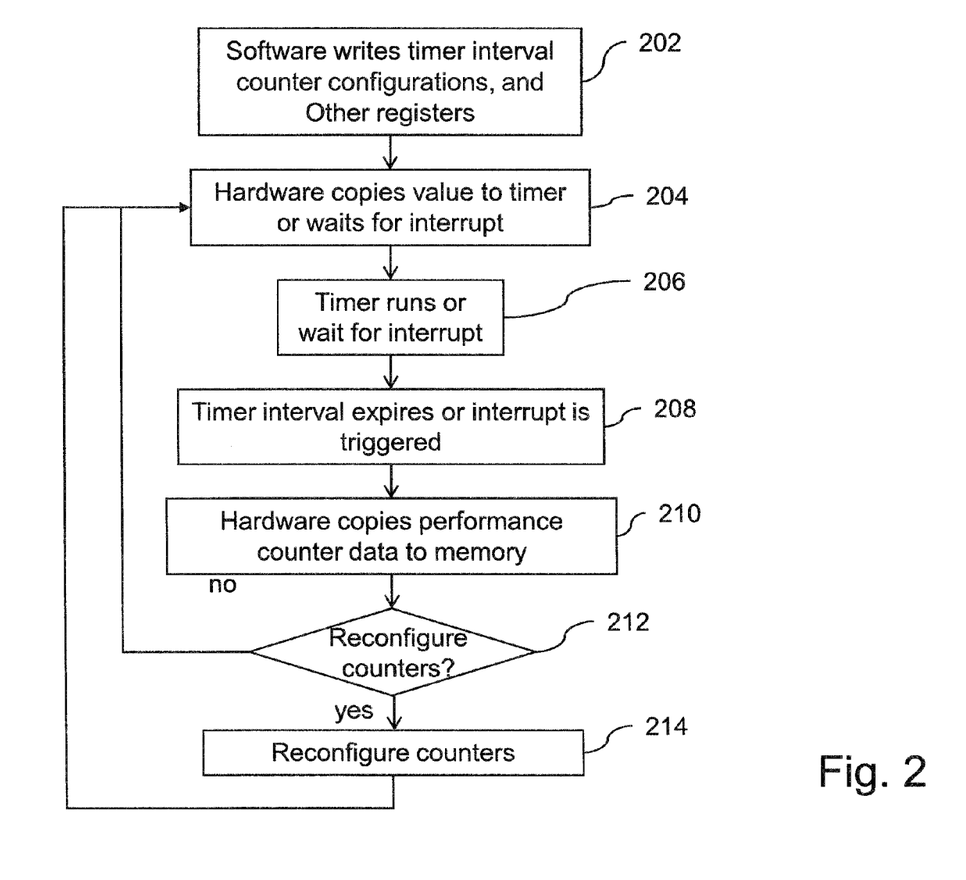
FIG. 2 is a flow diagram illustrating a method for hardware that supports reconfiguration and copy of hardware performance counters in one embodiment.

FIG. 2 is a flow diagram illustrating a method for reconfiguring and data copying of hardware performance counters in one embodiment of the present disclosure. At 202, software sets up all or some configuration registers in the performance counter unit 102. Software, which may be a user-level application or an operating system, may set up several counter configurations, and one or more starting memory addresses and lengths where performance counter data will be copied. In one aspect, software also writes time interval value into a designated register, and at 204, hardware transfers the value into a timer register. In another aspect an interrupt triggers the transfer of data or reconfiguration.

At 206, the timer register counts down the time interval value, and when the timer count reaches zero, notifies a state machine. Any other method of detecting expiration of the timer value may be utilized. At 208, the state machine triggers copying of all or selected performance counter register values to specified address in memory. At 210, hardware copies performance counters to the memory.

At 212, hardware checks if the configuration of performance counters needs to be changed, by checking a value in another register. If the configuration does not need to be changed, the processing returns to 204. At 214, a state machine changes the configuration of the performance counter data.

Figure 3:
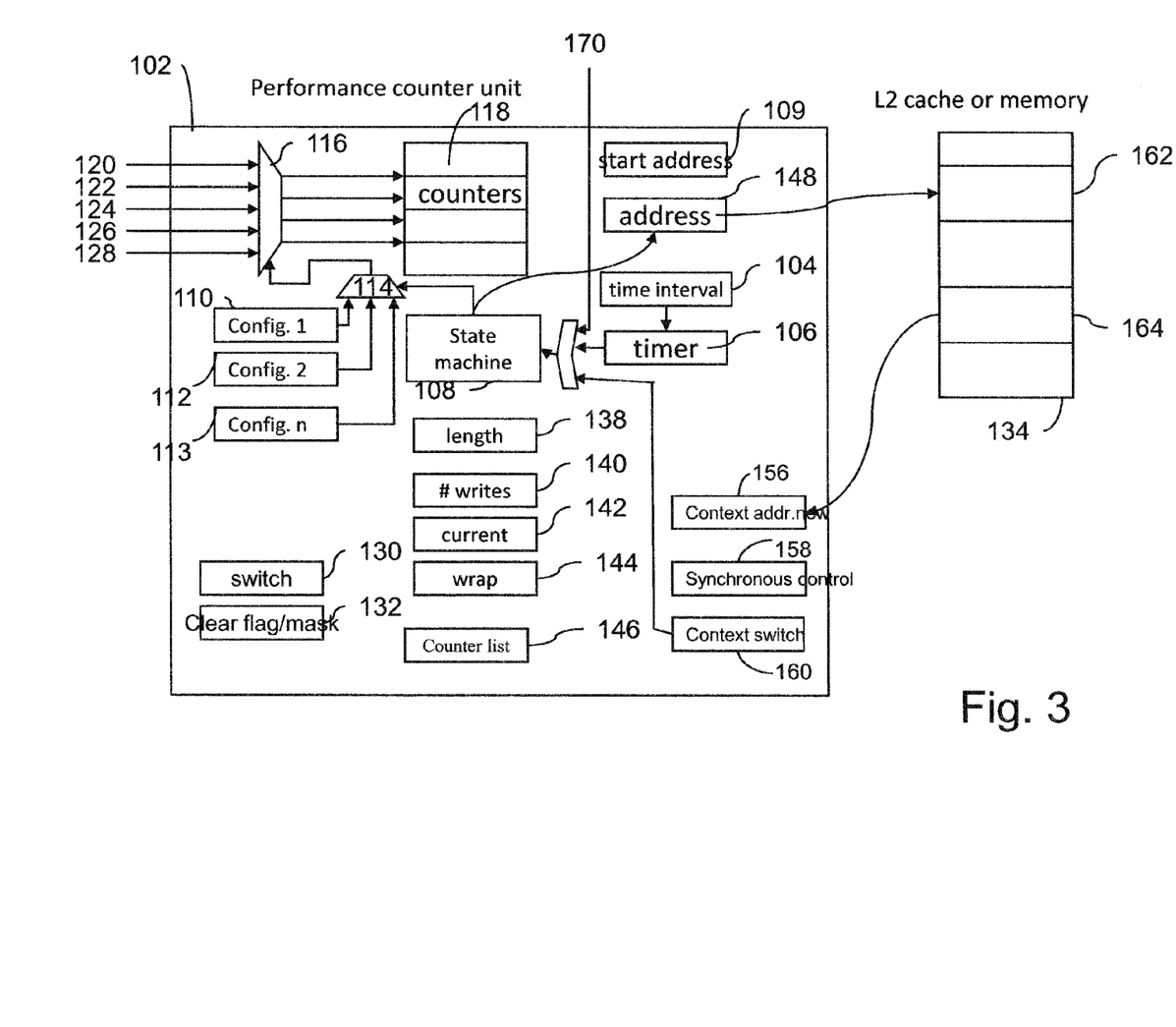
FIG. 3 shows a hardware device that supports performance counter reconfiguration, counter copy and OS context switching in another embodiment of the present disclosure.

FIG. 3 shows a hardware device that supports performance counter reconfiguration and copying, and OS context switching in one embodiment of the present disclosure. The hardware device shown in FIG. 3 may include all the elements shown and described with respect to FIG. 1. Further, the device may include automatic hardware support capabilities for operating system context switching. Automatic refers to the fact that the hardware goes through each of the control registers and data values of the hardware performance counter information and stores them all into memory rather than requiring the operating system or other such software (for example, one skilled in the art would understand how to apply the mechanisms described herein to a hypervisor environment) to read out the values individually and store the values itself.

While there are many operations that need to occur as part of a context switch, this disclosure focuses the description on those that pertain to the hardware performance counter infrastructure. In preparation for performing a context switch, the operating system, which knows of the characteristics and capabilities of the computer, will have set aside memory associated with each process commensurate with the number of hardware performance control registers and data values.

One embodiment of the hardware implementation to perform the automatic saving and restoring of data may utilize two control registers associated with the infrastructure, i.e., the hardware performance counter unit. One register, R1 (for convenience of naming), 156, is designated to hold the memory address that data is to be copied to or from. Another register, for example, a second register R2, 160, indicates whether and how the hardware should perform the automatic copying process. The value of second register may be normally a zero. When the operating system wishes to initiate a copy of the hardware performance information to memory it writes a value in the register to indicate this mode. When the operating system wishes to initiate a copy of the hardware performance values from memory it writes another value in the register that indicates this mode. For example, when the operating system wishes to initiate a copy of the hardware performance information to memory it may write a "1" to the register, and when the operating system wishes to initiate a copy of the hardware performance values from memory it may write a "2" to the register. Any other values for such indications may be utilized. This may be an asynchronous operation, i.e., the hardware and the operating system may operate or function asynchronously. An asynchronous operation allows the operating system to continue performing other tasks associated with the context switch while the hardware automatically stores the data associated with the performance monitoring unit and sets an indication when finished that the operating system can check to ensure the process was complete. Alternatively, in another embodiment, the operation may be performed synchronously by setting a third register. For example, R3, 158, can be set to "1" indicating that the hardware should not return control to the operating system after the write to R2 until the copying operation has completed.

Referring to FIG. 3, a performance counter unit 102 may be built into a microprocessor, or in a multiprocessor system, and includes a plurality of hardware performance counters 118, which are registers used to store the counts of hardware-related activities within a computer as described above.

A memory device 134, which may be an L2 cache or other memory, stores various data related to the running of the computer system and its applications. A register 109 stores an address location in memory 134 for storing the hardware performance counter information associated with the switched out process. For example, when the operating system determines it needs to switch out a given process A, it looks up in its data structures the previously allocated memory addresses (e.g., in 162) for process A's hardware performance counter information and writes the beginning value of that address range into a register 109. A register 156 stores an address location in memory 134 for loading the hardware performance counter information associated with the switched in process. For example, when the operating system determines it needs to switch in a given process B, it looks up in its data structures the previously allocated memory addresses (e.g., in 164) for process B's hardware performance counter information and writes the beginning value of that address range into a register 156.

Context switch register 160 stores a value that indicates the mode of copying, for example, whether the hardware should start copying, and if so, whether the copying should be from the performance counters 118 to memory 134, or from the memory 134 to the performance counters 118, for example, depending on whether the process is being context switched in or out. Table 1 for examples shows possible values that may be stored by or written into the context switch 160 as an indication for copying. Any other values may be used.

TABLE 1

| Value | Meaning of the value |
|---|---|
| 0 | No copying needed |
| 1 | Copy the current values from the performance counters to the memory location indicated in the context address current register, and then copy values from the memory location indicated in the context address new to the performance counters |
| 2 | Copy from the performance counters to the memory location indicated in the context address register |
| 3 | Copy from the memory location indicated in context address register to the performance counters |

The operating system for example writes those values into the register 160, according to which the hardware performs its copying.

A control state machine 108 starts the context switch operation of the performance counter information when the signal 170 is active, or when the timer 106 indicates that the hardware should start copying. If the value in the register 160 is 1 or 2, the circuitry of the performance counter unit 102 stores the current context (i.e., the information in the performance counters 118) of the counters 118 to the memory area 134 specified in the current address register 148. All performance counters and their configurations are saved to the memory starting at the address specified in the register 109. The actual arrangement of counter values and configuration values in the memory addresses can be different for different implementations, and does not change the scope of this invention.

If the value in the register 160 is 3, or it is 1 and the copy-out step described above is completed, the copy-in step starts. The new context (i.e., hardware performance counter information associated with the process being switched in) is loaded from the memory area 164 indicated in the context address 156. In addition, the values of performance counters are copied from the memory back to the performance counters 118. The exact arrangement of counter values and configurations values does not change the scope of this invention.

When the copying is finished, the state machine 108 may set the context switch register to a value (e.g., "0") that indicates that the copying is completed. In another embodiment, the performance counters may generate an interrupt to signal the completion of copying. The interrupt may be used to notify the operating system that the copying has completed. In one embodiment, the hardware clears the context switch register 160. In another embodiment, the operating system resets the context switch register value 160 (e.g., "0") to indicate no copying.

The state machine 108 copies the memory address stored in the context address register 156 to the current address register 148. Thus, the new context address register 156 is free to be used for the next context switch.

In another embodiment of the implementation, the second context address register 156 may not be needed. That is, the operating system may use one context address register 109 for indicating the memory address to copy to or to copy from, for context switching out or context switching in, respectively. Thus, for example, register 148 may be also used for indicating a memory address from where to context switch in the hardware performance counter information associated with a process being context switched in, when the operating system is context switching back in a process that was context switched out previously.

Additional number of registers or the like, or different configurations for hardware performance counter unit may be used to accomplish the automatic saving of storing and restoring of contexts by the hardware, for example, while the operating system may be performing other operations or tasks, and/or, so that the operating system or the software or the like need not individually read the counters and associated controls.

Figure 4:
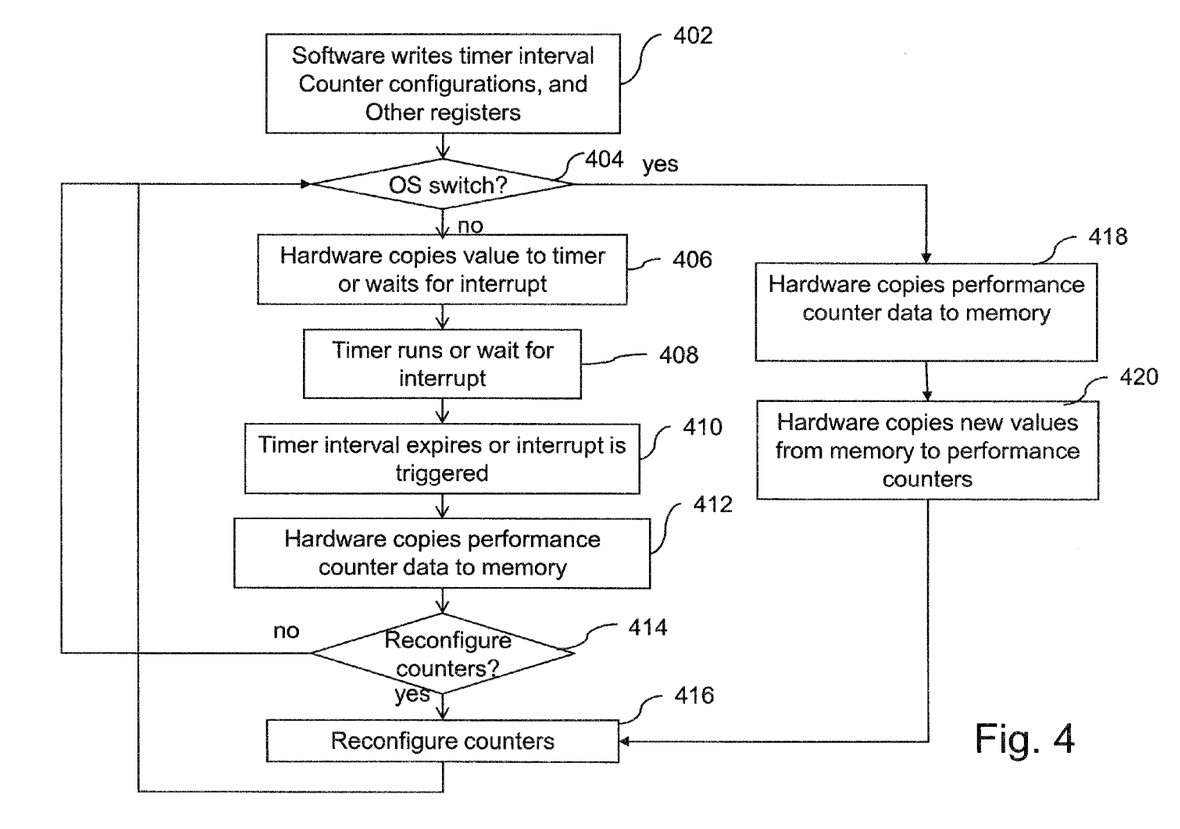
FIG. 4 is a flow diagram illustrating a method for hardware that supports counter reconfiguration, counter copy, and OS context switching of hardware performance counters in one embodiment.

FIG. 4 is a flow diagram illustrating a method for reconfiguring, data copying, and context switching of hardware performance counters in one embodiment of the present disclosure. While the method shown in FIG. 4 illustrates specific steps for invoking the automatic copying mechanisms using several registers, it should be understood that other implementation of the method and any number of registers or the like may be used for the operating system or the like to invoke an automatic copying of the counters to memory and memory to counters by the hardware, for instance, so that the operating system or the like does not have to individually read the counters and associated controls.

At 402, software sets up all or some configuration registers in the performance counter unit or module 102. Software, which may be a user-level application or an operating system, may set up several counter configurations, and one or more starting memory addresses and lengths where performance counter data will be copied. Software also writes time interval value into a designated register, and the information needed for switching out a given process A, and switching in the process B: allocated memory addresses for process A's hardware performance counter information, and writes the beginning value of that range into a register, e.g., register R1.

At 404, condition is checked if operating system switch needs to be performed. This can be initiated by receiving an external signal to start operating system switch, or the operating system or the like may write in another register (e.g., register R2) to indicate that copying from and to performance counters to the memory should begin. For instance, the operating system or the like writes "1" to R2.

At 406, if no OS switch needs to be performed, hardware transfers the value into a timer register. At 408, the timer register counts down the time interval value, and when the timer count reaches zero, notifies a state machine. Any other method of detecting expiration of the timer value may be utilized. At 410, the state machine triggers copying of all or selected performance counter register values to specified address in memory. At 412, hardware copies performance counters to the memory.

At 414, hardware checks if the configuration of performance counters needs to be changed, by checking a value in another register. If the configuration does not need to be changed, the processing returns to 404. At 416, a state machine changes the configuration of the performance counter data, and loops back to 404.

Going back to 404, operating system may indicate, for example, by storing a value, to begin context switching of the performance counter data, and the control transfers to 418. At 418, a state machine begins context switching the performance counter data, and copies the current context—all or some performance counter values, and all or some configuration registers into the memory. At 420, after values associated with process A are copied out, the values associated with process B are copied into the performance counters and configuration registers from the memory. For instance, the state machine copies data from another specified memory location into the performance counters. After the hardware finishes copying, the hardware resets the value at register R2, for example, to "0" to indicate that the copying is done, which indicates that the hardware has finished the copy. Finally, at 416, the new configuration consistent with the process B is performed.

At 414, the software may specify reconfiguring of the performance counters, for example, periodically or every time interval, and the hardware, for instance, the state machine, may switch configuration of the performance counters at the specified periods. The specifying of reconfiguring and the hardware reconfiguring may occur while the operating system thread is in one context in one aspect. In another aspect, the reconfiguration of the performance counters may occur asynchronously to the context switching mechanism.

At 418, the software may also specify copying of performance counters directly to memory, for instance, periodically or at every specified time interval. For example, the software may write a value in a register that automatically triggers the state machine (hardware) to automatically perform direct copying of the hardware performance counter data to memory without further software intervention. In one aspect, the specifying of copying the performance counter data directly to memory and the hardware automatically performing the copying may occur while an operating system thread is in context. In another aspect, this step may occur asynchronously to the context switching mechanism.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
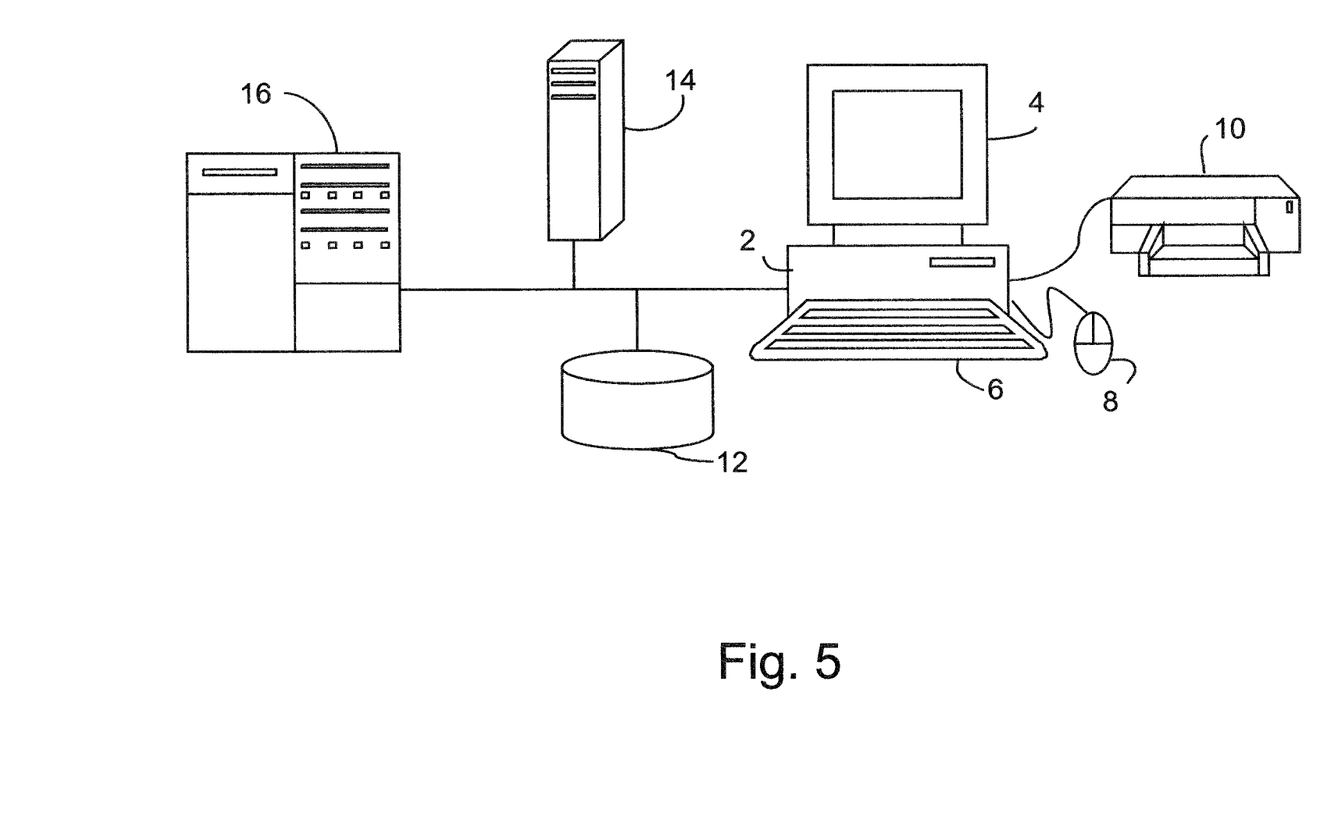
FIG. 5 illustrates an example of a computer system, in which the systems and methodologies of the present disclosure may be carried out or executed.

Referring now to FIG. 5, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A device for providing hardware support for multiplexing of performance counters, comprising:
   a plurality of performance counters operable to collect one or more counts of one or more selected activities;
   a plurality of registers operable to store a set of performance counter configurations; and
   a state machine operable to automatically select a register from the plurality of registers for reconfiguring the one or more performance counters in response to receiving a first signal, the state machine further operable to reconfigure the one or more performance counters based on a configuration specified in the selected register, the state machine further operable to copy data in selected one or more of the plurality of performance counters to a memory location, or from the memory locations to the counters, or both, in response to receiving a second signal;
   a multiplexer coupled to the state machine, the multiplexer selecting a set of activities to pass to the one or more performance counters based on configuration setting of the selected register.

2. The device of claim 1, wherein the first signal, or the second signal, or both, are received from one or more timers counting predetermined time interval.

3. The device of claim 2, wherein the predetermined time interval is programmable by software.

4. The device of claim 2, wherein the state machine resets the timer after reconfiguring, and the timer repeats counting the time interval.

5. The device of claim 1, further including a first storage element operable to provide an address of the memory location.

6. The device of claim 1, wherein the first storage element is a register.

7. The device of claim 1, further including a third storage element storing a value indicating the number of times to perform reconfiguring of the one or more performance counters.

8. The device of claim 1, wherein the first signal, or the second signal, or both, are interrupts generated by another device external to the device.

9. A method of providing hardware support for multiplexing of performance counters, comprising:
   writing a plurality of configuration values to a plurality of storage locations, at least one of the plurality of configuration values for indicating to hardware to automatically start context switching a plurality of performance counter data, to automatically transfer a plurality of performance counter data between a plurality of performance counters and memory location, or to automatically reconfigure the plurality of performance counters, or combinations thereof;
   selecting by a multiplexer, a set of activities to pass to the one or more performance counters based on one or more of the plurality of configuration values; and
   based on at least one of the plurality of configuration values, the hardware automatically starting context switching a plurality of performance counter data, automatically transferring a plurality of performance counter data between a plurality of performance counters and memory location, or automatically reconfiguring the plurality of performance counters, or combinations thereof,
   the writing of the plurality of configuration values including at least writing one of the plurality of configuration values in response to detecting a context switch of a thread.

10. The method of claim 9, wherein the storage locations include one or more registers, or memory locations, or combinations thereof.

11. The method of claim 9, wherein the writing step includes software programming the plurality of configuration values.

12. The method of claim 9, wherein one of the plurality of configuration values includes a time interval value, wherein a timer detects expiration of time specified by the time interval value and trigger the hardware to automatically start context switching a plurality of performance counter data, to automatically transfer a plurality of performance counter data between a plurality of performance counters and memory location, or to automatically reconfigure the plurality of performance counters, or combinations thereof.

13. The method of claim 9, wherein an interrupt triggers the hardware to automatically start context switching a plurality of performance counter data, to automatically transfer a plurality of performance counter data between a plurality of performance counters and memory location, or to automatically reconfigure the plurality of performance counters, or combinations thereof.

14. A non-transitory computer readable storage medium storing a program of instructions executable by a machine to perform a method of providing hardware support for multiplexing of performance counters, comprising:

writing a plurality of configuration values to a plurality of storage locations, at least one of the plurality of configuration values for indicating to hardware to automatically start context switching a plurality of performance counter data, to automatically transfer a plurality of performance counter data between a plurality of performance counters and memory location, or to automatically reconfigure the plurality of performance counters, or combinations thereof;

selecting by a multiplexer, a set of activities to pass to the one or more performance counters, based on one or more of the plurality of configuration values; and     based on at least one of the plurality of configuration values, the hardware automatically starting context switching a plurality of performance counter data, automatically transferring a plurality of performance counter data between a plurality of performance counters and memory location, or automatically reconfiguring the plurality of performance counters, or combinations thereof,     the writing of the plurality of configuration values including at least writing one of the plurality of configuration values in response to detecting a context switch of a thread.

15. The computer readable storage medium of claim 14, wherein the storage locations include one or more registers, or memory locations, or combinations thereof.

16. The computer readable storage medium of claim 14, wherein the writing step includes software programming the plurality of configuration values.

17. The computer readable storage medium of claim 14, wherein one of the plurality of configuration values includes a time interval value, wherein a timer detects expiration of time specified by the time interval value and trigger the hardware to automatically start context switching a plurality of performance counter data, to automatically transfer a plurality of performance counter data between a plurality of performance counters and memory location, or to automatically reconfigure the plurality of performance counters, or combinations thereof.

18. The computer readable storage medium of claim 14, wherein an interrupt triggers the hardware to automatically start context switching a plurality of performance counter data, to automatically transfer a plurality of performance counter data between a plurality of performance counters and memory location, or to automatically reconfigure the plurality of performance counters, or combinations thereof.

19. A non-transitory computer readable storage medium storing a program of instructions executable by a machine to perform a method of providing hardware support for multiplexing of performance counters, comprising:

writing a configuration value to a memory location; and automatically selecting by a multiplexer based on the configuration value, performance counter data to context switching, performance counter data to transfer between a performance counter and a specified memory location, or a performance counter to reconfigure, or combinations thereof; and     the hardware automatically starting context switching the selected performance counter data, automatically transferring the selected performance counter data between the performance counter and the specified memory location, or automatically reconfiguring the performance counter, or combinations thereof.

20. The computer readable storage medium of claim 19, wherein the configuration value is written in response to detecting a context switch of a thread.

\* \* \* \* \*